US012776010B2

(12) United States Patent
Wiemker et al.

(10) Patent No.: US 12,776,010 B2
(45) Date of Patent: Oct. 27, 2026

(54) MACHINE LEARNING OF EDGE RESTORATION FOLLOWING CONTRAST SUPPRESSION/MATERIAL SUBSTITUTION

(71) Applicant: KONINKLIJKE PHILIPS N.V., Eindhoven (NL)

(72) Inventors: Rafael Wiemker, Kisdorf (DE); Liran Goshen, Pardes-Hanna (IL); Heike Carolus Ruppertshofen, Ahrensburg (DE); Tobias Klinder, Uelzen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 519 days.

(21) Appl. No.: 18/038,562

(22) PCT Filed: Nov. 28, 2021

(86) PCT No.: PCT/EP2021/083264
§ 371 (c)(1),
(2) Date: May 24, 2023

(87) PCT Pub. No.: WO2022/117470
PCT Pub. Date: Jun. 9, 2022

(65) Prior Publication Data

US 2024/0005455 A1 Jan. 4, 2024

(30) Foreign Application Priority Data

Dec. 3, 2020 (EP) .................................... 20211551

(51) Int. Cl.
*G06T 5/70* (2024.01)
*G06T 5/20* (2006.01)
(Continued)

(52) U.S. Cl.
CPC .................. *G06T 5/70* (2024.01); *G06T 5/20* (2013.01); *G06T 5/60* (2024.01); *G06T 5/77* (2024.01);
(Continued)

(58) Field of Classification Search
CPC .... G06T 5/20; G06T 5/60; G06T 5/70; G06T 5/77; G06T 7/12; G06T 11/008;
(Continued)

(56) References Cited

U.S. PATENT DOCUMENTS 10,282,588 B2 5/2019 Comaniciu
10,565,479 B1 2/2020 Lesniak
(Continued)

FOREIGN PATENT DOCUMENTS

WO WO2020172188 A1 8/2020

OTHER PUBLICATIONS

Van Ravesteijn et al., "Electronic Cleansing for 24-H Limited Bowel Preparation CT Colonography Using Principal Curvature Flow," in IEEE Transactions on Biomedical Engineering, vol. 60, No. 11, pp. 3036-3045, Nov. 2013, accessed Jun. 8, 2026 via <https://ieeexplore.ieee.org/document/6514531> (Year: 2013).*
(Continued)

*Primary Examiner* — John Villecco
*Assistant Examiner* — Joshua B. Crockett
(74) *Attorney, Agent, or Firm* — Larry Liberchuk

(57) ABSTRACT

The present invention relates to edge restoration. In order to improve a restoration of the artificially created cleansed edges, an apparatus is proposed to automatically restore image edges after digital subtraction of digital material substitution to optimally resemble image edges in unmodified locations. The appearance of edges is machine-learned in an unsupervised non-analytical way from unmodified
(Continued)

locations, and then, after digital suppression or digital material substitution, applied to the artificially created cleansed edges.

13 Claims, 3 Drawing Sheets

(51) Int. Cl.

| | |
|---|---|
| ***G06T 5/60*** | (2024.01) |
| ***G06T 5/77*** | (2024.01) |
| ***G06T 7/12*** | (2017.01) |
| ***G06T 12/30*** | (2026.01) |
| ***G06V 10/44*** | (2022.01) |

(52) U.S. Cl.
CPC ................ *G06T 7/12* (2017.01); *G06T 12/30* (2026.01); *G06V 10/44* (2022.01); *G06T 2207/10081* (2013.01); *G06T 2207/10088* (2013.01); *G06T 2207/20081* (2013.01); *G06T 2207/20084* (2013.01); *G06T 2207/30028* (2013.01); *G06T 2207/30104* (2013.01); *G06T 2210/41* (2013.01); *G06T 2211/404* (2013.01); *G06V 2201/032* (2022.01)

(58) Field of Classification Search
CPC . G06T 2207/10081; G06T 2207/10088; G06T 2207/20081; G06T 2207/20084; G06T 2207/30028; G06T 2207/30104; G06T 2210/41; G06T 2211/404; G06V 10/44; G06V 2201/032
See application file for complete search history.

(56) References Cited

U.S. PATENT DOCUMENTS

| | | | | |
|---|---|---|---|---|
| 10,902,597 | B2 | 1/2021 | Grimmer | |
| 2006/0094961 | A1* | 5/2006 | Mikheev | G06V 10/457 600/437 |
| 2009/0304248 | A1* | 12/2009 | Zalis | G06T 7/12 382/131 |
| 2010/0208956 | A1 | 8/2010 | Liang | |
| 2011/0135180 | A1 | 6/2011 | Sugrue | |
| 2016/0217573 | A1 | 7/2016 | Lian | |
| 2018/0315188 | A1* | 11/2018 | Tegzes | G06T 7/11 |
| 2019/0370963 | A1 | 12/2019 | Chiu | |
| 2022/0284584 | A1* | 9/2022 | Lee | G06V 10/82 |
| 2023/0377104 | A1* | 11/2023 | Steen | G06T 5/70 |

OTHER PUBLICATIONS

PCT International Search Report, International application No. PCT/EP2021/083264, Apr. 7, 2022.
Tachibana R. et al., "Deep Learning Electronic Cleansing for Single- and Dual-Energy CT Colonography", Adiographics, vol. 38, No. 7, Nov. 1, 2018 (Nov. 1, 2018), pp. 2034-2050, XP055802252.
Zalis ME et al., "Digital Subtraction Bowel Cleansing for CT Colonography Using Morphological and Linear Filtration Methods", IEEE Transactions on Medical Imaging, IEEE Service Center, Piscataway, NJ, US, vol. 23, No. 11, Nov. 1, 2004 (Nov. 1, 2004), pp. 1335-1343, XP001237727.
Serlie I. et al., "Computed Cleansing for Virtual Colonoscopy Using a Three-Material Transition Model", Lecture Notes in Computer Science, Jan. 1, 2003 (Jan. 1, 2003), pp. 175-183, XP055096939.

* cited by examiner

MACHINE LEARNING OF EDGE RESTORATION FOLLOWING CONTRAST SUPPRESSION/MATERIAL SUBSTITUTION

FIELD OF THE INVENTION

The present invention generally relates to edge restoration, and in particular relates to an apparatus for processing a medical image of an object of interest, a medical imaging system, a method for processing a medical image of an object of interest, a computer program element, and a computer readable medium.

BACKGROUND OF THE INVENTION

For certain clinical applications, diagnostic reading (viewing) may be improved by subtracting or suppressing image content at locations which are tagged by contrast agent, e.g. stool residuals in colonoscopy, following oral administration of contrast ('electronic cleansing'), or blood following vascular injection of contrast agent ('black blood'). The tagged areas may be substituted with a virtual material (e.g. air, also known as subtraction or suppression). After this substitution, image edges with tagging-neighbourhood may have a different appearance compared to edges without tagging-neighbourhood, thus causing irritation to the user. This is because the intensity difference of the tagged material to its surroundings is in general different in sign as well as amplitude in comparison to non-tagged image locations, which causes specific transition profiles.

Therefore, a restoration of the artificially created cleansed edges is required to yield a visually satisfactory suppressed/cleansed image for improved diagnostic reading. However, this restoration step is tedious to develop and tune, and may be different for various image types and different reconstruction techniques. In particular, for spectral CT images and derivatives, such as virtual mono-energy images, a different restoration may be needed for each spectral band image.

SUMMARY OF THE INVENTION

There may be a need to improve a restoration of the artificially created cleansed edges.

The object of the present invention is solved by the subject-matter of the independent claims, wherein further embodiments are incorporated in the dependent claims. It should be noted that the following described aspects of the invention apply also for the apparatus, the medical imaging system, the method, the computer program element, and the computer readable medium.

According to a first aspect of the present invention, there is provided an apparatus for processing a medical image of an object of interest that comprises a first image part not comprising image content to be suppressed and a second image part comprising image content to be suppressed. The apparatus comprises an input module, a contour classifier module, a suppression module, a training module, an inference module, and an output module. The input module is configured for receiving the medical image of the object of interest. The contour classifier module is configured for detecting an image contour of the object of interest and dividing the detected image contour into a first image contour and a second image contour, wherein the first image contour is representative of an image contour of the first image part of the object of interest, and the second image contour is representative of an image contour of the second image part of the object of interest. The suppression module is configured for suppressing the image content to be suppressed or substituting the image content to be suppressed with a virtual material to generate a cleansed image. The training module is configured for training a data-driven model using image data of the first image contour to learn an appearance of the image contour of the object of interest. The inference module is configured for applying the trained data-driven model to the cleansed image to generate a restored image of the object of interest. The output module is configured for providing the generated restored image of the object of interest.

As noted above, diagnostic reading (viewing) may be improved by subtracting or suppressing image content of an object of interest (e.g. colon) at locations, which are tagged by contrast agent, e.g. stool residuals in colonoscopy. The tagged areas may be substituted with a virtual material, such as air, thereby creating artificially cleansed edges.

In order to improve a restoration of the artificially created cleansed edges, an apparatus (e.g. a computing device) is proposed to automatically restore an image contour, i.e. image edges, after digital subtraction or digital material substitution to optimally resemble image edges in unmodified locations. In particular, the appearance of the image edges of the object of interest is machine-learned in an unsupervised non-analytical way from the image data at unmodified edge locations different from the artificially created cleansed edges. As the active learning for training the data-driven model is based on the unmodified edges, no manual annotations are required, thereby eliminating tedious and repetitive manual annotation work, which would require delicate sub-voxel accuracy. Additionally, the restoration of the edge profiles is not restricted to certain discrete or analytical filters, such as Dilations, Gaussian, etc. Rather, the flexibility of machine learning may allow synthesizing and exploring a wide range of edge appearances, which are not limited by analytical functions. Further, the algorithm may adapt automatically to varying edge appearances in various image types, and replaces the tedious manual search for a certain restoration technique.

In an example, integrated auto-encoders may be used as the data-driven model, which map image patches directly onto themselves—that is, the input type equals output type. Examples of the auto-encoders may include, but are not limited to, principle component auto-encoders, sparse auto-encoders, deep neural auto-encoders, variational auto-encoders, generative auto-encoders, and random forest auto-encoders.

In another example, a multivariate regressor may be used as the data-driven model for explicitly encoding of local image patches into a latent subspace and reproducing image data from the latent subspace. One example is to use material-classifiers to transform the original image into material images with or without material concentrations per pixel/voxel. A multivariate regressor can then be trained on all image patches to reproduce the original image intensities from the material images.

After machine-learning of the appearance of the image edges of the object of interest at the unmodified edge locations, the trained data-driven model can be applied to the artificially created cleansed edges to perform a restoration.

The proposed apparatus and method may be used with standard CT, MM (Magnetic Resonance Imaging), or CBCT (Cone Beam Computed Tomography), but also may be extended to spectral CT or multi-parametric MM. In spectral CT or multi-parametric MRI, the algorithm may allow to adapt specifically to the appearance in each spectral band.

The term “suppression” may refer to e.g. ‘electronically suppressed’, ‘electronically cleansed’, ‘made transparent’, or ‘set to air-like appearance’.

The term “image data”, as used herein, may refer to two-dimensional image data composed of pixels or three-dimensional image data composed of voxels.

The term “image contour”, as used herein, may refer to a structural outline of an object of interest in the image. The structural outline comprises points at which the image brightness changes sharply, or formally, has discontinuities. The discontinuities in image brightness correspond to changes of material properties. Taking a medical image of a colon for example, the discontinuities in image brightness may correspond to transitions between colon-enveloping soft tissue and intra-colonic gas, transitions between contrast agent and colon-enveloping soft tissue, etc.

The term “image data of an image contour”, as used herein, may comprise pixels or voxels within a limited distance from the structural outline of the object of interest in the image. It will be appreciated that the image data of a particular contour should not contain pixels or voxels that represent totally different transitions than the one of interest.

According to an embodiment of the present invention, the data-driven model comprises an auto-encoder configured for mapping local image patches directly onto themselves. Each local image patch represents one or a group of pixels or voxels in the medical image.

Examples of the auto-encoder may include, but are not limited to, principle component auto-encoders, sparse auto-encoders, deep neural auto-encoders, variational auto-encoders, generative auto-encoders, and random forest auto-encoders.

The term “image patch” refers to a patch or group of pixels or voxels having a specific size, shape, and location corresponding to an image. For example, image patches can have a predetermined pixel width/height (e.g., 7×7, 8×8, 11×11, or the like) and a location for each image patch can be defined based on one or more centre pixels or voxels.

The local image patch may have any suitable shape, such as a circular shape, a rectangular shape, a square shape, etc.

According to an embodiment of the present invention, the data-driven model comprises a multivariate regressor configured for explicitly encoding of local image patches into a latent subspace and reproducing image data from the latent subspace. Each local image patch represents one or a group of pixels or voxels in the medical image.

Instead of direct auto-encoding, the data-driven model may use explicit encoding of the image patches into a latent subspace, followed by a decoding into the original image space.

According to an embodiment of the present invention, the apparatus further comprises a material classifier module configured for transforming the medical image of the object of interest into material images. The training module is configured for training the multivariate regressor for reproducing image data from the material images.

In this embodiment, material-classifiers may be used to transform the original image into material images with or without material concentrations per pixel/voxel. A multivariate regressor can then be trained on image patches to reproduce the original image intensities from the material images.

According to an embodiment of the present invention, the apparatus further comprises a tessellation module configured for tessellating the medical image of the object of interest into a plurality of local regions and replacing an image intensity of the medical image by a mean intensity of the plurality of local regions. The training module is configured for training the multivariate regressor for reproducing image data from the mean intensity of the plurality of local regions.

In this embodiment, the original image may be tessellated into local regions, also referred to as super pixels or supervoxels, and all image intensities may be replaced by the local region's mean intensity (also referred to as the subspace). The suppression module may then replace e.g. the mean contrast value of a region by the mean value of air. A multivariate regressor (e.g. random forest regression or support vector regression) may be trained on image patches to reproduce the original image patch intensities from the supervoxel (or superpixel)-mean-intensities. Specifically, the central intensity of any image patch can be estimated as a regression value from its surrounding image patch values.

According to an embodiment of the present invention, the training module is configured for training the data-driven model in a training phase and freezing the trained data-driven model. The inference module is configured for applying the frozen trained data-driven model in an inference phase.

The term “inference phase” refers to deployment or application phase.

This training scheme may have a large training set and reproducible performance.

According to an embodiment of the present invention, the training module is configured for training on the fly on a new instance of a medical image of the object of interest.

This on-the-fly training scheme may train specifically on any new image type, which may not have been seen during training.

According to an embodiment of the present invention, the apparatus further comprises a tagging module configured for detecting the image content to be suppressed.

In an example, the tagging model is a pre-trained classifier.

In an example, the tagging model uses thresholding for segmenting images to determine the image content to be suppressed.

According to an embodiment of the present invention, the apparatus further comprises a compositing module configured for compositing the medical image and the restored image of the object of interest.

According to an embodiment of the present invention, the image content to be suppressed comprises image content at locations, which are tagged by a contrast agent.

According to an embodiment of the present invention, the image content tagged by a contrast agent comprises at least one of:

stool residuals in colonoscopy; or blood in angiography.

For blood in angiography, the contrast agent may be administered e.g. by vascular injection or by oral administration of contrast.

According to a second aspect of the present invention, there is provided a medical imaging system. The medical imaging system comprising a scanner configured to scan an object of interest to acquire a medical image of the object of interest, and an apparatus according to the first aspect and any associated examples for processing the medical image of the object of interest.

The scanner may be a standard CT, MM, or CBCT scanner, but also may be extended to a spectral CT or multi-parametric MRI scanner.

According to a third aspect of the present invention, there is provided a computer-implemented method for processing a medical image of an object of interest that comprises a first image part not comprising image content to be suppressed and a second image part comprising image content to be suppressed, the computer-implemented method comprising:

a) receiving the medical image of the object of interest;

b) detecting an image contour of the object of interest and dividing the detected image contour into a first image contour and a second image contour, wherein the first image contour is representative of an image contour of the first image part of the object of interest, and the second image contour is representative of an image contour of the second image part of the object of interest;

c) suppressing the image content to be suppressed or substituting the image content to be suppressed with a virtual material to generate a cleansed image;

d) training a data-driven model using image data of the first image contour to learn an appearance of the image contour of the object of interest;

e) applying the trained data-driven model to the cleansed image to generate a restored image of the object of interest; and f) providing the generated restored image of the object of interest.

According to another aspect of the present invention, there is provided a computer program element configured, during execution, to perform the method step of the third aspect and any associated example.

According to a further aspect of the present invention, there is provided a computer readable medium comprising the computer program element.

Advantageously, the benefits provided by any of the above aspects equally apply to all of the other aspects and vice versa.

As used herein, the term "learning" in the context of machine learning refers to the identification and training of suitable algorithms to accomplish tasks of interest. The term "learning" includes, but is not restricted to, association learning, classification learning, clustering, and numeric prediction.

As used herein, the term "machine-learning" refers to the field of the computer sciences that studies the design of computer programs able to induce patterns, regularities, or rules from past experiences to develop an appropriate response to future data, or describe the data in some meaningful way.

As used herein, the term "data-driven model" in the context of machine learning refers to a suitable algorithm that is learnt on the basis of appropriate training data.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

In the following, the approach is described in relation with a medical image of a colon. Although the following detailed description is described using application to CT virtual colonoscopy for the purposes of illustration, anyone of ordinary skill in the art will appreciate that the method, apparatus, and medical imaging system described above and below can be adapted to other object of interest, e.g. blood following vascular injection of contrast agent, and to other imaging modality, e.g. MRI or CBCT. Accordingly, the following described examples are set forth without any loss of generality to, and without imposing limitations upon, the claimed invention.

Polyps in the colon can possibly develop into colon cancer. If removed early, cancer can be prevented effectively. It is therefore recommended also for asymptomatic patients above a certain age to perform endoscopic inspection of the colon (colonoscopy) in order to detect and assess possible polyps. Unfortunately, compliance with this screening is low, mainly due to the discomfort associated with endoscopy. Therefore, non-invasive virtual colonoscopy (VC) based on CT was developed as an alternative (also known as CT-colonography, or CT-C). VC is the virtual inspection of the colon wall on a computer screen, either by standard transsectional slice viewing or optionally rendered with the help of Volume Rendering (VR) techniques. In VC, VR results in animate impression similar to the view of a real endoscope during colonoscopy. A necessary step for the clinical inspection of the colon in VC is removing remains of stool or faeces from the colon image prior to visualization, so called Virtual Cleansing. Unfortunately, the CT contrast of faeces is similar to the contrast of the tissue surrounding the colon. Therefore, this pre-processing of the image is usually supported by orally administering a laxative to remove stool followed by orally administering contrast agent containing iodine prior to CT imaging in order to tag remaining stool. This tagging helps removing the remaining faeces from the image. In order to create a visualization of a virtual empty colon, the Hounsfield values of voxels with faeces are set to the value of air.

However, after this substitution, image edges with tagging-neighbourhood may have a different appearance compared to edges without tagging-neighbourhood, thus causing visual irritation and having a negative effect on diagnostic reading. This is because the intensity difference of the tagged material to its surroundings is in general different in sign as well as amplitude in comparison to non-tagged image locations, and causes specific transition profiles.

Figure 1:
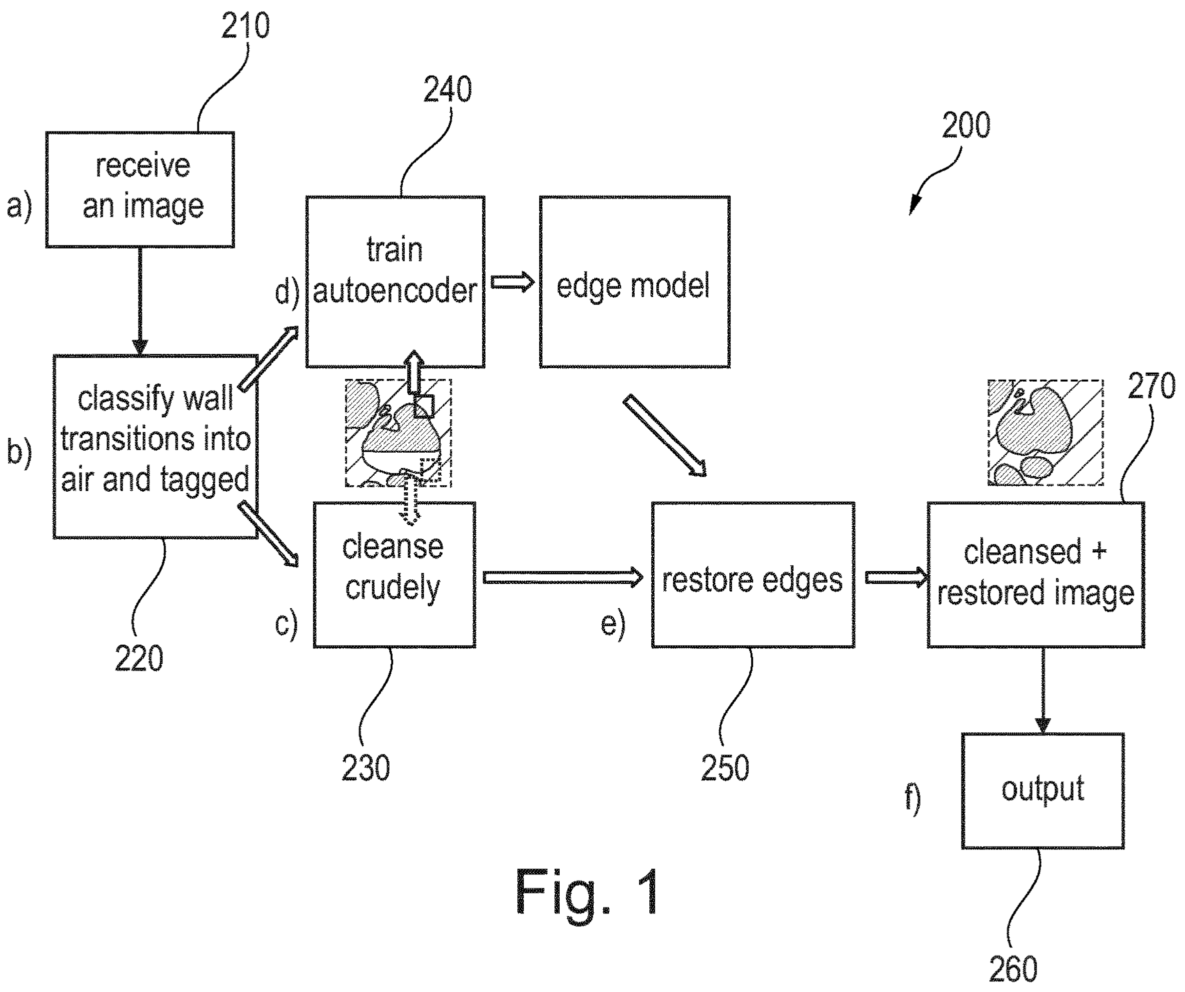
FIG. 1 shows a flow chart of a computer-implemented method.

In order to improve a restoration of the artificially created cleansed edges, FIG. 1 shows a flow chart of a computer-implemented method 200 according to some embodiments of the present disclosure. The computer-implemented method 200 is proposed for processing a medical image of an object of interest that comprises a first image part not comprising image content to be suppressed and a second image part comprising image content to be suppressed.

The computer-implemented method 200 may be implemented as a device, module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 200 may be written in any combination of one or more programming languages, including an object oriented programming language such as JAVA, SMALLTALK, C++, Python, or the like and conventional procedural programming languages, such as the "C" programming language or similar programming languages.

In step 210, i.e. step a), a medical image 10 of the object of interest is received.

The medical image may be a two-dimensional image comprising image pixel data or a three-dimensional image comprising image voxel data.

In an example, the object of interest is a colon. In an example, the object of interest is a lumen of vasculature.

Figures 2A, 2B, 2C:
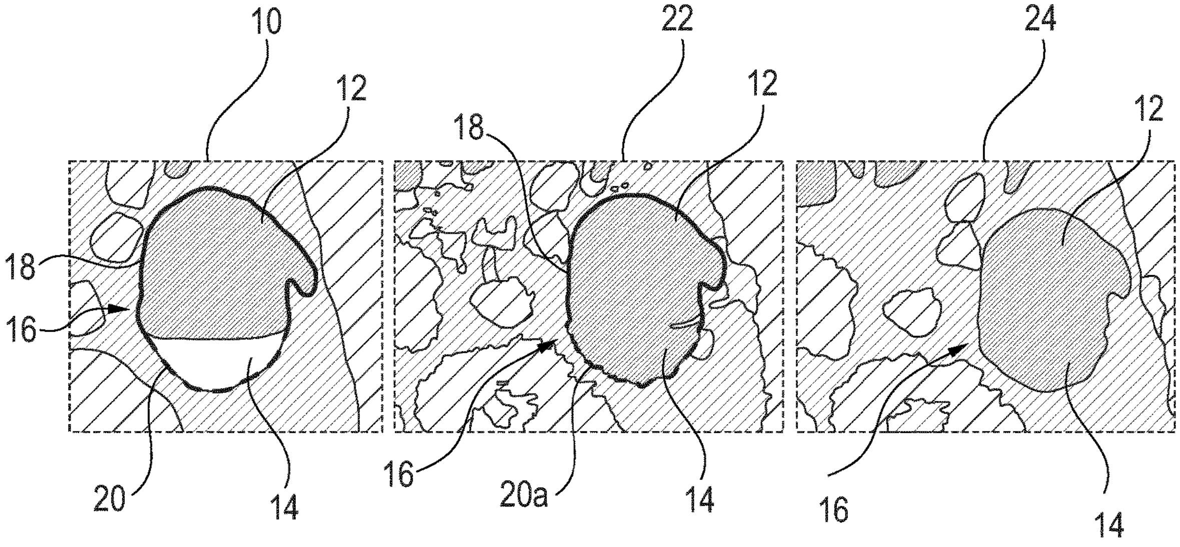
FIG. 2A shows an example of a medical image of an object of interest.
FIG. 2B shows a cleansed image of the example of FIG. 2A.
FIG. 2C shows a restored image of the example of FIG. 2A.

An exemplary medical image 10 of a colon is illustrated in FIG. 2A. The exemplary medical image 10 comprises a first image part 12 not comprising image content to be suppressed and a second image part 14 comprising image content to be suppressed. In this example, the image content to be suppressed is the tagged stool residuals in colonoscopy.

Turning to FIG. 1, in step 220, i.e. step b), an image contour 16 of the object of interest is detected. Edge detection is the name for a set of mathematical methods, which aim at identifying points in a digital image at which the image brightness changes sharply or, more formally, has discontinuities. The points at which image brightness changes sharply are typically organized into a set of curved line segments termed edges. Various techniques may be used for edge detection, such as Prewitt edge detection, Laplacian edge detection, LOG edge detection, canny edge detection, etc.

The detected image contour 16 is divided into a first image contour 18 and a second image contour 20. The first image contour 18 is representative of an image contour of the first image part 12 of the object of interest, and the second image contour 20 is representative of an image contour of the second image part 14 of the object of interest.

In an example, a pre-trained classifier may be used which detects image locations in the medical image where suppression is desirable, e.g. based on the difference in image intensities between image content to be suppressed and other image content. The classifier may be trained in a training phase, and the frozen classifier is applied in the inference phase, i.e. deployment or application phase.

In another example, thresholding may be used for segmenting the medical image to determine the image content to be suppressed.

In the example illustrated in FIG. 2A, the first image contour 18 is indicated with a solid line, while the second image contour 20 is indicated with a dotted line. The first image contour 18 is representative of an air-tissue transition, while the second image contour is representative of a stool-tissue transition. As the tagged stool residuals are the image content to be suppressed, the second image contour 20, after suppression or substitution, will become an artificial created cleansed edge 20*a* (see FIG. 2B).

Turning to FIG. 1, in step c), the image content to be suppressed is suppressed to generate a cleansed image 22. Alternatively, the image content to be suppressed is substituted with a virtual material to generate a cleansed image 22.

The term "suppression" may refer to e.g. 'electronically suppressed', 'electronically cleansed', 'made transparent', or 'set to air-like appearance'.

An exemplary cleansed image 22 is illustrated in FIG. 2B. In this example, the image intensities in the second image part 14 that comprises the tagged stool residuals are substituted with a value of air, thereby creating an artificially created cleansed edge 20*a*. The artificially created cleansed edge 20*a*, which is indicated with the dashed line, has a different appearance compared to the first image contour 18 indicated with the solid line. For example, the second image contour 20 has an unsmooth edge. This is because the intensity difference of the tagged material to its surroundings is in general different in sign as well as amplitude in comparison to non-tagged image locations, and causes specific transition profiles. The different appearance between the artificially created cleansed edge 20*a* and the first image contour 18 (i.e. the unmodified image contour of the object of interest) may affect the diagnostic reading.

To improve edge restoration, in step 240 of FIG. 1, i.e. step d), a data-driven model is trained using image data of the first image contour 18 to learn an appearance of the image contour 16 of the object of interest. In other words, the appearance of the image contour of the object of interest is machine-learned in an unsupervised non-analytical way from unmodified locations, and then—after digital suppression or substitution—applied to the artificially created cleansed edges to perform a restoration of edges.

The image data of the first contour comprises pixels or voxels within a limited distance from the first contour. It will be appreciated that the image data of the first contour should not contain pixels or voxels that represent totally different transitions than the one of interest, such as image data of the second contour. The image data of the first contour used for training the data-driven model should be selected from contours of interest, e.g., transition between colon-enveloping soft tissue and intra-colonic gas (typically air and carbon-dioxid), and in particular to make sure not to learn from other contours, e.g., transitions between colon-envelope and contrast agent. Additionally, the training is performed on the specific scan itself, rather than a prior data base, as each scan has a unique contrast-noise appearance due to varying scan protocol settings, patient weight, etc. Two training schemes may be used for training the data driven model.

In a first training scheme, the data-driven model is trained in a training phase, and the frozen data-driven model applied in the inference phase, i.e. deployment or application phase. In training mode, an initial model of the data-driven model is trained based on a set of training data to produce a trained data-driven model. In deployment mode, also referred to as inference mode, the pre-trained data-driven model is fed with non-training, new data, to operate during normal use. The advantage may be a large training set and reproducible performance.

In a second training scheme, the data-driven model is training on the fly on a new instance of an image, after the tagging classifier inference has been applied. The advantage may be that the model can train specifically on any new image type, which may not have been seen during training.

Local two-dimensional or three-dimensional image patches may be used for modelling the data-driven model, which are smaller than the overall image. Each local two-dimensional image patch represents one or a group of pixels in a two-dimensional medical image or one or a group of voxels in a three-dimensional medical image.

In an example, the data driven model may comprise an auto-encoder configured for mapping local image patches directly onto themselves. Various types of auto-encoders may be used, such as principle component auto-encoders, sparse auto-encoders, deep neural auto-encoders, variational auto-encoders, generative auto-encoders, and random forest auto-encoders.

Instead of direct auto-encoding, the data-driven model may comprise a multivariate regressor configured for explicitly encoding of local image patches into a latent subspace and reproducing image data from the latent subspace using explicit encoding of the image patches into a latent subspace, followed by a decoding into the original image space.

One example is to use material-classifiers to transform the original image into material images with or without material concentrations per pixel/voxel. A multivariate regressor can then be trained on all patches to reproduce the original image intensities from the material images.

In a further example, the original image is tessellated into local regions (also referred to as super pixels or supervoxels), and all image intensities are replaced by the local region's mean intensity (also referred to as the subspace). A multivariate regressor, e.g. random forest regression or supper vector regression, may then be trained on all patches to reproduce the original image patch intensities from the supervoxel-mean-intensities. Specifically, the central intensity of any image patch can be estimated as a regression value from its surrounding image patch values.

In the example of FIG. 2B, the medical image 10 may be tessellated into local regions, such as supervoxels, e.g. using a simple learning iterative clustering (SLIC), and all image intensities are replaced by the local region's mean intensity. Then all contrast-tagged regions are replaced by the mean value of air. A multivariate random forest regressor may be trained on all paths from the whole image volume, which do not contain tagging to reproduce the original image patch intensities from the supervoxel-mean intensities. In this example, the central intensity of any 7×7 image patch is estimated as a random forest regression value from its surrounding image patch values (e.g. flattened as a one-dimension feature vector).

Turning to FIG. 1, in step 250, i.e. step e), the trained data-driven model, also referred to as edge model, is applied to the cleansed image 22 to generate a restored image 24 of the object of interest.

As the active learning for training the data-driven model is based on the unmodified edges, i.e. the first image contour 18, no manual annotations are required, thereby eliminating tedious and repetitive manual annotation work. Additionally, the restoration of the edge profiles is not restricted to certain discrete or analytical filters, such as Dilations, Gaussian, etc. Rather, the flexibility of machine learning may allow to synthesize and explore a wide range of edge appearances, which are not limited by analytical functions. Further, the algorithm may adapt automatically to varying edge appearances in various image types, and replaces the tedious manual search for a certain restoration technique.

An exemplary restored image is illustrated in FIG. 2C. In this example, the data-driven model trained on the first image contour 18 (also referred to as unmodified edges or non-tagging edges) can be applied on both the first image contour 18 and the artificially created cleansed edge 20*a* (also referred to as modified edges or tagging edges) in the cleansed image 22 to generate the restored image 24 of the object of interest.

Turning to FIG. 1, in step 260, i.e. step f), the generated restored image of the object of interest is provided to e.g. a display, or an image analyser for further processing the restored image, etc.

Optionally, as shown in FIG. 1, the computer-implemented method 200 may further comprise the step of compositing the medical image 10 and the restored image of the object of interest 24. In other words, the edge-restored image 24 is not the final image presented to a user, since only edges towards air have been processed. The restore image 24 may be composited with the original medical image for all locations far from tagging.

It should also be understood that, unless clearly indicated to the contrary, in any methods claimed herein that include more than one step or act, the order of the steps or acts of the method is not necessarily limited to the order in which the steps or acts of the method are recited. For example, in FIG. 1, steps 230 and 240 may be performed simultaneously or in a sequential manner.

The computer-implemented method described above may be extended for spectral CT or spectral MR. For example, in spectral CT, e.g. with the Philips "IQon Spectral CT" it is possible to create synthesized mono-energetic images at different keV values. In other words, the at least one three-dimensional medical image may comprise synthesized mono-energetic images acquired at different energies. In these mono-energetic images, different materials show different contrast. Spectral CT has the potential to better discriminate different materials (e.g. faeces and tissue) than conventional CT. Spectral Virtual Colonoscopy may lead to a higher specificity of the screening even without bowel preparation. The method described above allows specifically to the appearance in each spectral band in the multi-channel images.

The computer-implemented method described above is also versatile for different clinical applications, such as virtual colonoscopy as described above and angiography.

Figure 3:
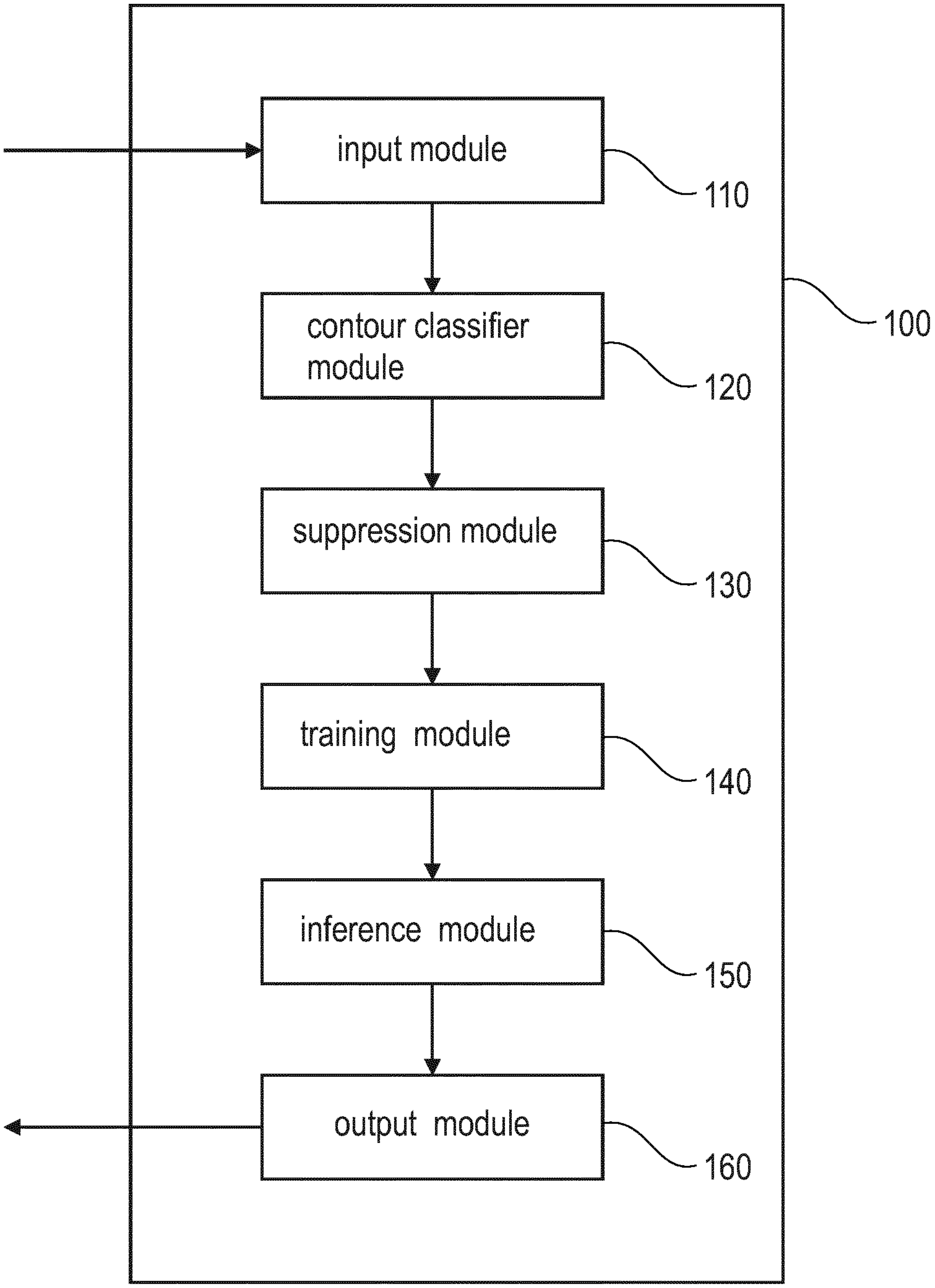
FIG. 3 shows an example of an apparatus.

FIG. 3 schematically shows an example of an apparatus 100 for processing a medical image of an object of interest that comprises a first image part not comprising image content to be suppressed and a second image part comprising image content to be suppressed.

The apparatus 100 comprises an input module 110, a contour classifier module 120, a suppression module 130, a training module 140, an inference module 150, and an output module 160. Each module may be part of, or include an Application Specific Integrated Circuit (ASIC), an electronic circuit, a processor (shared, dedicated, or group) and/or memory (shared, dedicated, or group) that execute one or more software or firmware programs, a combinational logical circuit, and/or other suitable components that provide the described functionality.

The apparatus 100 may be any computing device, such as mobile devices, laptop and desktop computers, wearable computing devices, and other computing devices, suitable for processing image data.

The input module 110 is configured for receiving the medical image of the object of interest. The medical image may be a two-dimensional image comprising image pixel data or a three-dimensional image comprising image voxel data. Examples of the imaging modality may include, but are not limited to, CT and MM.

The contour classifier module 120 is configured for detecting an image contour of the object of interest and dividing the detected image contour into a first image contour and a second image contour. The first image contour is representative of an image contour of the first image part of the object of interest, and the second image contour is representative of an image contour of the second image part of the object of interest. An exemplary of operation of the contour classifier module 120 is described in step 220 of FIG. 1.

The suppression module 130 is configured for suppressing the image content to be suppressed or substituting the image content to be suppressed with a virtual material to generate a cleansed image. An exemplary operation of the suppression module 130 is described in step 230 of FIG. 1.

The training module 140 is configured for training a data-driven model using image data of the first image contour to learn an appearance of the image contour of the object of interest.

An exemplary operation of the training module 140 is described in step 240 of FIG. 1.

In an example, the data-driven model comprises an auto-encoder configured for mapping local image patches directly onto themselves. Each local image patch represents one or a group of pixels or voxels in the medical image. Examples of the auto-encoder may include, but are not limited to, principle component auto-encoders, sparse auto-encoders, deep neural auto-encoders, variational auto-encoders, generative auto-encoders, and random forest auto-encoders.

In an example, the data-driven model comprises a multivariate regressor configured for explicitly encoding of local image patches into a latent subspace and reproducing image data from the latent subspace. Each local image patch represents one or a group of pixels or voxels in the medical image.

In an example, the apparatus 100 may further comprise a material classifier module (not shown) configured for transforming the medical image of the object of interest into material images. The training module is configured for training the multivariate regressor for reproducing image data from the material images.

In an example, the apparatus 100 may further comprise a tessellation module configured for tessellating the medical image of the object of interest into a plurality of local regions and replacing an image intensity of the medical image by a mean intensity of the plurality of local regions. The training module is configured for training the multivariate regressor for reproducing image data from the mean intensity of the plurality of local regions.

Two training schemes may be used for training the data-driven model.

In a first training scheme, the training module 140 is configured for training the data-driven model in a training phase and freezing the trained data-driven model. The inference module is configured for applying the frozen trained data-driven model in an inference phase.

In a second training scheme, the training module 140 is configured for training on the fly on a new instance of a medical image of the object of interest.

The inference module 150 is configured for applying the trained data-driven model to the cleansed image to generate a restored image of the object of interest. An exemplary operation of the inference module 150 is described in step 250 of FIG. 1.

The output module 160 is configured for providing the generated restored image of the object of interest, e.g. to a display (for example, a built-in screen, a connected monitor or projector) or to a file storage (for example, a hard drive or a solid state drive).

Optionally, the apparatus 100 may comprise a tagging module configured for detecting the image content to be suppressed. In an example, the tagging module may apply a pre-trained classifier for detecting tagged locations in the image where suppression is desirable. In an example, the tagging module may use thresholding to segment the medical image to determine the image content to be suppressed.

Optionally, the apparatus 100 may comprise a compositing module (not shown) configured for compositing the medical image and the restored image of the object of interest. An exemplary operation of the compositing module is shown in step 260 of FIG. 1.

Figure 4:
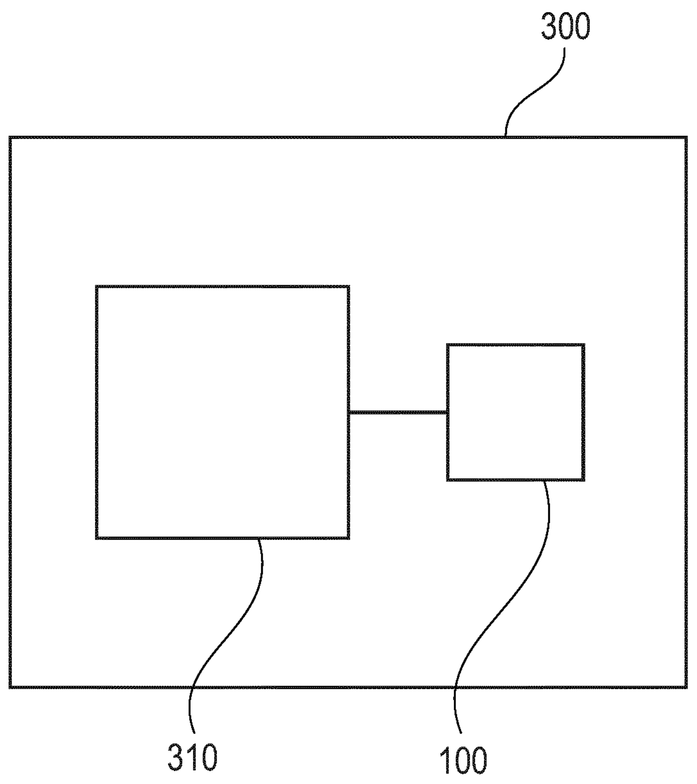
FIG. 4 shows an example of a medical imaging system.

FIG. 4 schematically shows a medical imaging system 300 according to some embodiments of the present disclosure.

The medical imaging system 300 comprises a scanner 310 configured to scan an object of interest to acquire at least one three-dimensional image of the object of interest. The scanner 310 may be a CT-scanner or an Mill scanner.

The medical imaging system 300 further comprises an apparatus 100 for processing a medical image of an object of interest acquired by the scanner.

All definitions, as defined and used herein, should be understood to control over dictionary definitions, definitions in documents incorporated by reference, and/or ordinary meanings of the defined terms.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.”

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An apparatus for processing a medical image of an object of interest, the apparatus comprising:

an input module configured for receiving the medical image of the object of interest that comprises a first image part not comprising image content to be suppressed and a second image part comprising image content to be suppressed;

a contour classifier processing circuitry configured for detecting an image contour of the object of interest and dividing the detected image contour into a first image contour and a second image contour, wherein the first image contour is representative of an image contour of the first image part of the object of interest, and the second image contour is representative of an image contour of the second image part of the object of interest;

a suppression processing circuitry configured for suppressing the image content to be suppressed or substituting the image content to be suppressed with a virtual material to generate a cleansed image;

a training processing circuitry configured for training a data-driven model using image data of the first image contour only to learn an appearance of the image contour of the object of interest;

an inference processing circuitry configured for applying the trained data-driven model to the cleansed image to generate a restored image of the object of interest; and an output module configured for providing the generated restored image of the object of interest.

2. The apparatus according to claim 1, wherein the data-driven model comprises an auto-encoder configured for mapping local image patches directly onto themselves, wherein each local image patch represents one or a group of pixels or voxels in the medical image.

3. The apparatus according to claim 1, wherein the data-driven model comprises a multivariate regressor configured for explicitly encoding local image patches into a latent subspace and reproducing image data from the latent subspace, wherein each local image patch represents one or a group of pixels or voxels in the medical image.

4. The apparatus according to claim 3, further comprising:

a material classifier processing circuitry configured for transforming the medical image of the object of interest into material images, wherein the training processing circuitry is configured for training the multivariate regressor for reproducing image data from the material images.

5. The apparatus according to claim 3, further comprising:

a tessellation processing circuitry configured for tessellating the medical image of the object of interest into a plurality of local regions and replacing an image intensity of the medical image by a mean intensity of the plurality of local regions, wherein the training processing circuitry is configured for training the multivariate regressor for reproducing image data from the mean intensity of the plurality of local regions.

6. The apparatus according to claim 1, wherein the training processing circuitry is configured for training the data-driven model in a training phase and freezing the trained data-driven model; and wherein the inference processing circuitry is configured for applying the frozen trained data-driven model in an inference phase.

7. The apparatus according to claim 1, wherein the training processing circuitry is configured for training on the fly on a new instance of a medical image of the object of interest.

8. The apparatus according to claim 1, further comprising:

a tagging processing circuitry configured for detecting the image content to be suppressed.

9. The apparatus according to claim 1, further comprising:

a compositing processing circuitry configured for compositing the medical image and the restored image of the object of interest.

10. The apparatus according to claim 1, wherein the image content to be suppressed comprises image content at locations which are tagged by a contrast agent.

11. The apparatus according to claim 10, wherein the image content tagged by a contrast agent comprises at least one of:

stool residuals in colonoscopy; and blood in angiography.

12. A computer-implemented method for processing a medical image of an object of interest, the computer-implemented method comprising:

receiving the medical image of the object of interest that comprises a first image part not comprising image content to be suppressed and a second image part comprising image content to be suppressed;

detecting an image contour of the object of interest and dividing the detected image contour into a first image contour and a second image contour, wherein the first image contour is representative of an image contour of the first image part of the object of interest, and the second image contour is representative of an image contour of the second image part of the object of interest;

suppressing the image content to be suppressed or substituting the image content to be suppressed with a virtual material to generate a cleansed image;

training a data-driven model using image data of the first image contour only to learn an appearance of the image contour of the object of interest;

applying the trained data-driven model to the cleansed image to generate a restored image of the object of interest; and providing the generated restored image of the object of interest.

13. A non-transitory computer-readable medium for storing executable instructions, which cause a method to be performed to process a medical image of an object of interest, the method comprising:

receiving the medical image of the object of interest that comprises a first image part not comprising image content to be suppressed and a second image part comprising image content to be suppressed;

detecting an image contour of the object of interest and dividing the detected image contour into a first image contour and a second image contour, wherein the first image contour is representative of an image contour of the first image part of the object of interest, and the second image contour is representative of an image contour of the second image part of the object of interest;

suppressing the image content to be suppressed or substituting the image content to be suppressed with a virtual material to generate a cleansed image;

training a data-driven model using image data of the first image contour only to learn an appearance of the image contour of the object of interest;

applying the trained data-driven model to the cleansed image to generate a restored image of the object of interest; and providing the generated restored image of the object of interest.

* * * * *